Dec. 24, 1935.     H. TONAI     2,025,624
VEHICLE DIRECTION SIGNAL
Filed June 8, 1934     3 Sheets-Sheet 1

Hideo Tonai, INVENTOR
BY Victor J. Evans & Co.
ATTORNEY

WITNESS:

Dec. 24, 1935.  H. TONAI  2,025,624
VEHICLE DIRECTION SIGNAL
Filed June 8, 1934  3 Sheets-Sheet 2
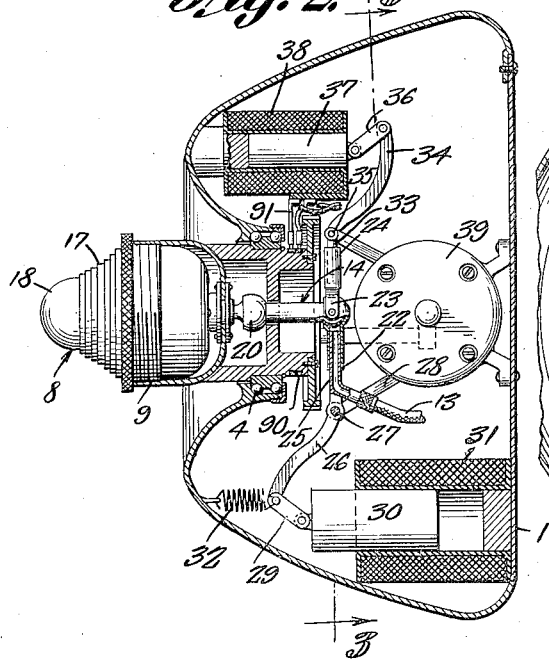
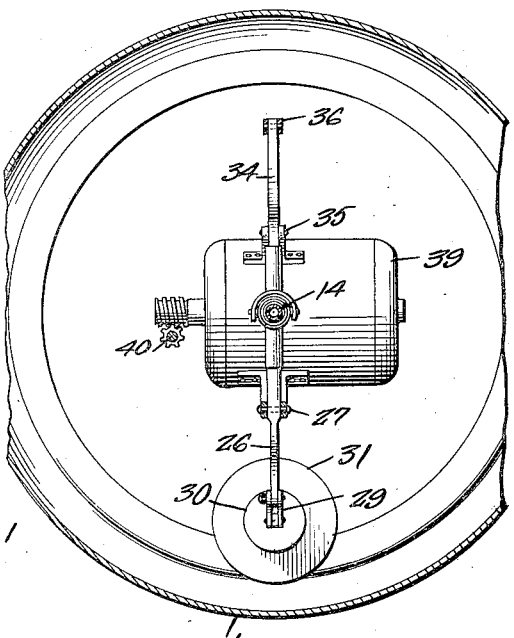
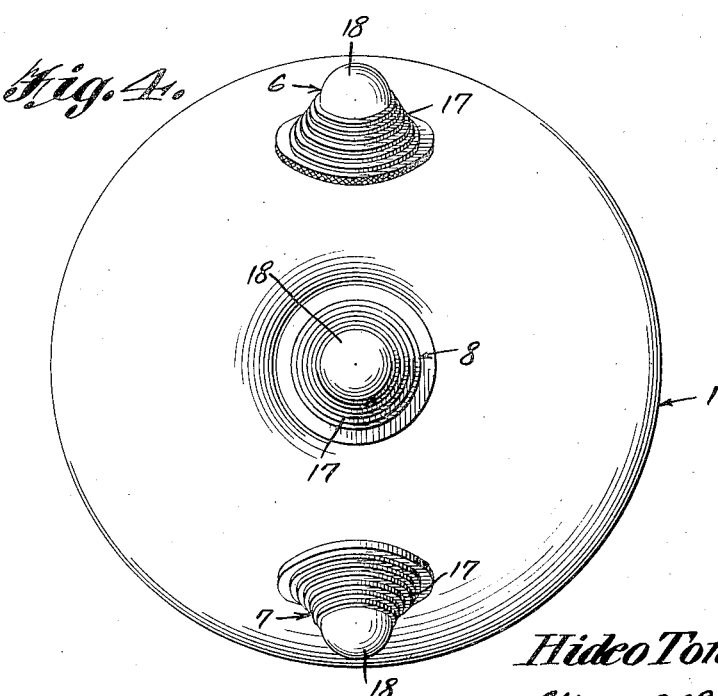
Hideo Tonai,
INVENTOR
BY Victor J. Evans & Co.
ATTORNEY

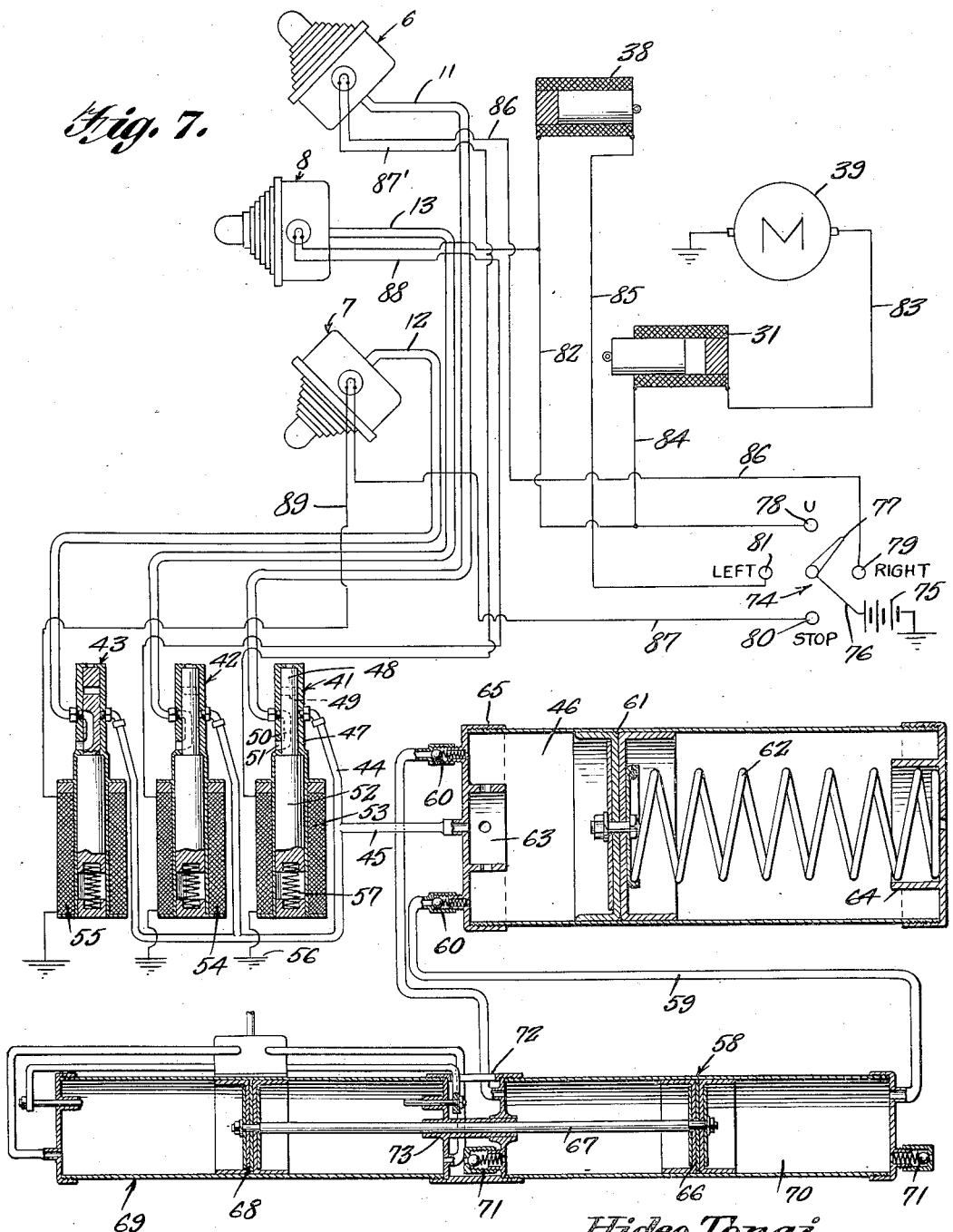

Patented Dec. 24, 1935

2,025,624

UNITED STATES PATENT OFFICE 2,025,624

VEHICLE DIRECTION SIGNAL

Hideo Tonai, Honolulu, Territory of Hawaii

Application June 8, 1934, Serial No. 729,719

6 Claims. (Cl. 177—327)

This invention relates to direction signals for motor vehicles and has for the primary object, the provision of a device which is provided with telescopic signal elements capable of occupying signaling and non-signaling positions and are under manual control so that a driver of the motor vehicle may at any time indicate to traffic various signals, such as contemplated left and right hand turns, U-turns, and a stop or slowing down of the vehicle.

Another object of this invention is the provision of means for accentuating the visibility of the signaling element when in signaling position.

A further object of this invention is the provision of a combined pneumatic and electrical means under manual control for effecting operation of the signal elements, one of said elements being changeable as to its position with respect to the support or motor vehicle so as to either indicate a stop signal or a U-turn signal while the other signal elements indicate right and left hand turns or signals.

A still further object of this invention is the provision of a vacuum operated compressor for automatically maintaining a supply of air pressure employed to actuate the pneumatic means of the device, said compressor depending on the vacuum developed by the engine of the motor vehicle for its operation.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a sectional view taken on the line 1—1 of Figure 4, illustrating an automatic vehicle signal constructed in accordance with my invention and showing one of the signaling elements in signaling position while another pair of said signaling elements are shown occupying a non-signaling position.

Figure 2 is a sectional view taken on the line 2—2 of Figure 1.

Figure 3 is a sectional view taken on the line 3—3 of Figure 2.

Figure 4 is a front elevation illustrating the signal.

Figure 7 is a diagrammatical view showing the wiring diagram and pneumatic operating mechanism for the signaling elements.

Figure 1:
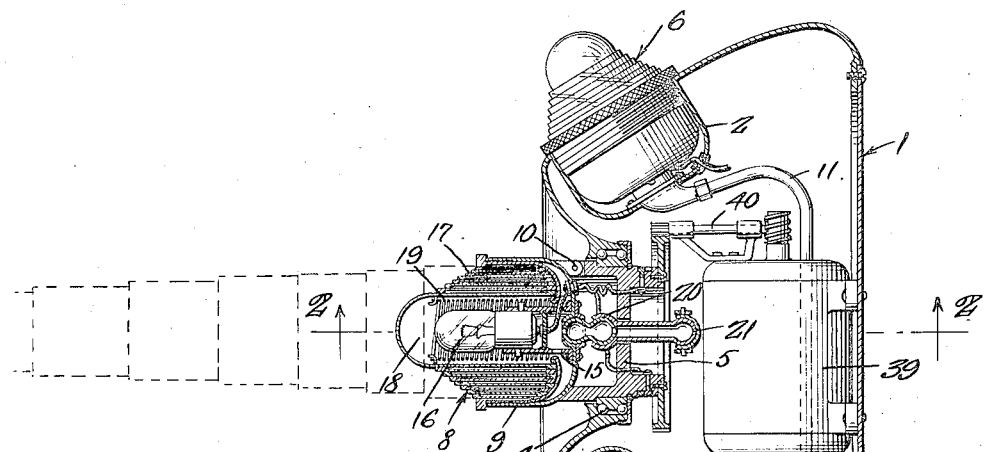

Referring in detail to the drawings, the numeral 1 indicates a main casing or housing which may be mounted on a motor vehicle in any wellknown manner and is preferably of substantially dome shape having arranged in the curved walls thereof cup-shaped elements or seats 2 and 3 extending at acute angles to each other. The casing or housing 1 in the curved walls thereof and between the seats 2 and 3, is formed with an opening, the walls of which form a raceway to receive an anti-friction bearing 4 which rotatably supports a seat or cup-shaped element 5. Signal elements 6, 7 and 8 are mounted in the seats 2, 3 and 5. The signal element 6 when in signaling position is adapted to indicate a turn to the right while the signal element 7 in signaling position is adapted to indicate a stop. The signal element 8 when in one of its signaling positions is to indicate a left turn and when in its other signaling position and rotated is to indicate a U-turn. The signal elements are of telescopic formation so that they can be extended to occupy a signaling position and collapsed to occupy a non-signaling position and they are preferably of different colors and each constructed of a semi-transparent material so that illumination within will more readily render the signaling elements visible and especially at night time.

The signal elements each include a cup-shaped base 9 and the bases 9 of the signal elements 6 and 7 are threaded into the seats 2 and 3 while the base 9 of the signal element 8 is connected to the cup-shaped element 5 by a hinge 10. Pneumatic tubes 11 and 12 extend into the housing or casing 1 and are connected to the bases 9 of the signal elements 6 and 7. A pneumatic tube 13 also enters the housing or casing 1 and is connected to a sectional pipe 14 which is in turn connected to the base 9 of the signal element 8. The detailed construction of the sectional pipe 14 will be hereinafter more fully described. Electric lamp sockets 15 are mounted in the bases of the signal elements and support electric lamps 16 within the signal elements and the latter each consists of a series of nested or telescopically arranged sections 17 having limited slidable connection with each other and the innermost section, indicated by the character 18, has its outer end closed so that said innermost section 18 will form a cylinder-like element to receive air pressure which acts to move the signal elements into extended position, as shown in Figure 1. Coiled springs 19 are attached to the bases 9 and to the innermost sections 18 of the signal elements for the purpose of collapsing the sections of the signal elements when freed of air pressure so that the signal elements collapse into position which are in close proximity to the curved wall of the housing or casing 1 where the signal elements will practically be non-noticeable and out of the way, eliminating liability of catching into or striking against some foreign object. It is to be understood that the signal elements only protrude from the casing or housing 1 a considerable distance when in signaling position, this position only being maintained for short periods of time to indicate various signals to traffic in the vicinity of the respective motor vehicle.

Figure 5:
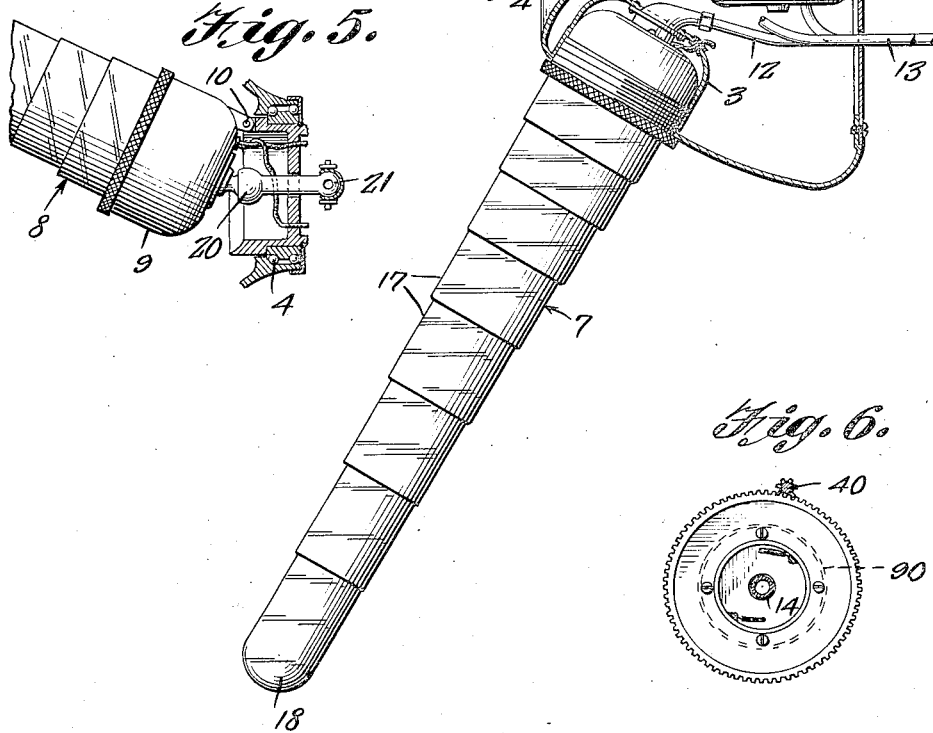
Figure 5 is a fragmentary sectional view showing one of the mountings for one of the signaling elements whereby the latter may change its position relative to the support and also permit of said signaling element to rotate when in signaling position.
Figure 6:
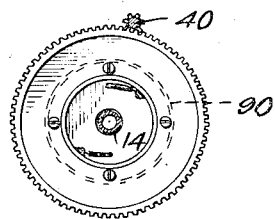
Figure 6 is a detail view showing a gear drive between an electrical power source and one of the signaling elements.

The sectional pipe 14 has a ball and socket connection 20 with the base 9 of the signal element 8 so that said base 9 may swing angularly to the pipe 14 as suggested in Figure 5, and the other end of the pipe has a ball and socket joint 21, one section of which terminates in a sleeve 22 and said section also has pivoted thereto the forked end 23 of a sleeve 24. The sleeves 22 and 24 extend in opposite directions. The sleeve 22 receives the end 25 of a lever 26, the latter being pivotally mounted, as shown at 27. The end 25 of the lever 26 is of hollow formation communicative with the ball joint 21 of the pipe 14 and also is equipped with a fitting 28 to which the tube 13 is connected. The other end of the lever 26 is pivoted to a link 29 which is in turn pivoted to a core 30 of a solenoid 31 mounted in the housing or casing 1. A spring 32 is connected to the link 29 and to the housing 1 for returning the signal element from the position shown in Figure 5 to the position shown in Figure 2. The spring 32 works in opposition to the movement of the core 30 when the solenoid 31 is energized. The sleeve 24 receives an end 33 of a lever 34, the latter being pivotally mounted, as shown at 35. The other end of the lever 34 is pivoted to a link 36 which is in turn pivoted to a core 37 of a solenoid 38 mounted in the housing or casing 1. The solenoid 38 when energized acts to retain the signal element 8 in the position shown in Figure 2 and coacts with the spring 32 in its action.

An electric motor 39 is mounted in the casing or housing 1 and is geared to a shaft 40 which in turn is geared to the cup-shaped mounting 5 for the purpose of rotating the latter when the circuit is closed to the electric motor. The rotation of the cup-shaped member 5 also rotates the signal element 8, this taking place when said signal element 8 is in signaling position and disposed at an acute angle, as shown in Figure 5, to indicate a U-turn.

Electrically operated valves 41, 42 and 43 are provided for the control of the pneumatic feature of the signal elements 6, 8 and 7. The outlet of the valve 41 is connected to the tube 11 of the signal element 6 and the outlet of the valve 42 is connected to the tube 13 of the signal element 8 while the outlet of the valve 43 is connected to the tube 12 of the signal element 7. The inlets of the valves 41, 42 and 43 are connected to branch tubes 44 which in turn connect to a tube 45 and the latter is in communication with a storage tank 46 mounted in any suitable place upon the motor vehicle. The valves 41, 42 and 43 each include a casing 47 in which the inlet and outlet ports are formed and casing slidably supports a plunger type valve element 48 having ports 49 and 50. The casing 47 also has a vent opening 51. The valve elements form an integral part of cores 52 of solenoids 53, 54 and 55 all of which are electrically connected to a ground 56. The electric lamps of the signal elements, the solenoids 38 and 31 and electric motor 39 are connected to the ground. The cores 52 are provided with springs 57 normally acting to position the valve elements to unalign or non-communicate the ports 49 with the inlet and outlet ports of the valves. The valve elements when so positioned connect the tubes 11, 13 and 12 to the atmosphere by the ports 50 being in communication with said pipes and the vent openings 51. The valve elements when in the stated position permit the springs 19 to collapse the signal elements.

A double acting compressor 58 is connected to the storage tank 46 by pipes 59, check valves 60 being provided for said pipes to prevent back pressure from the storage tank 46 to the compressor 58. The compressor 58 acts to build up air pressure in the storage tank 46 and the latter has mounted for sliding movement therein a piston 61 engaged by a coil spring 62, the action of which is to aid in forcing the air from said storage tank to the electrically actuated valves and thence to the signal elements. An apertured stop 63 is provided in the tank 46 to prevent the piston when in one position from closing the communication between the tank 46 and the pipe 45. The spring 62 is suitably secured to the piston 61 at one end and the opposite end is received in a seat 64 carried by a removable head of the tank 46. The tank 46 is also provided with a removable head 65 to which the pipes 59 and check valves 60 are connected. The piston 66 of the compressor 58 has the stem 67 thereof connected to a piston 68 and the latter forms a part of a vacuum operated motor 69, the latter being connected to the intake manifold of the engine of the motor vehicle and its construction and operation is similar to that found in a vacuum operated windshield wiper. Therefore, a detail description of the motor 69 is not thought necessary. The compressor 58 includes a cylinder 70, opposite ends of which are provided with check valve controlled air intake mediums 71. The ends of the cylinder 70 are connected to the pipes 59 so that on reciprocation of the piston 66 in either direction air will be forced into the storage tank 46. The cylinders of the motor 69 and compressor 58 are suitably connected in alignment, as shown at 72, and the stem of the pistons 66 and 68 operate in a suitable bushing or sleeve 73 connecting the cylinders referred to.

The vacuum developed by the engine is sufficient to operate the motor 69 to maintain a desired amount of air pressure in the storage tank 46. However, when the air pressure in the storage tank develops to an amount which would prevent reciprocation of the pistons 66 and 68 by the motor 69 the latter will become stalled and will remain so until the air pressure in the tank 46 decreases sufficiently to be overcome by the action of the vacuum developed by the engine of the motor vehicle.

A four-way switch 74 of the manually controlled type is mounted on the motor vehicle in convenient reach of the driver and is connected to the storage battery 75 of the motor vehicle by a conductor 76. The four-way switch 74 includes a finger piece 77 to be moved into and out of engagement with contacts 78, 79, 80 and 81. The positions of the contacts of the switch are preferably indicated upon the latter by the words "Left", "Right", "U" and "Stop" so that the driver may at a glance determine in which direction the finger piece 77 of the switch is to be moved to connect with a desired contact for the purpose of bringing about the operation of a desired signal element. It is preferable that the finger piece 77 be pivotally mounted so that it can be readily brought into engagement with any of the contacts described. The motor 39 is grounded and is electrically connected to the solenoid 31 by a conductor 83 and the solenoid is connected to the contact 78 by a conductor 84 which is also connected to the electric lamp of the signal element 8. The contact 81 is electrically connected to the solenoid 38 by a conductor 85 and the solenoid 38 is connected to the conductor 82 placing said solenoid in circuit with the electric lamp of the signal element 8. The contact 79 of the switch 74 is electrically connected to the electric lamp of the signal element 6 by a conductor 86. The contact 80 of the switch 74 is electrically connected to the electric lamp of the signal element 7 by a conductor 87. The electric lamp of the signal element 6 is electrically connected to the solenoid 53 by a conductor 87' and the electric lamp of the signal element 8 is electrically connected to the solenoid 54 by a conductor 88. The electric lamp of the signal element 7 is electrically connected to the solenoid 55 by a conductor 89.

In operation, the positioning of the finger piece 77 of the switch 74 in engagement with the contact 79 will illuminate the electric lamp of the signal element 6 and energize the solenoid 53 causing illumination of the signal element 6 and a movement of the latter into an extended or signaling position by air pressure from the supply tank 46. The energization of the solenoid 53 actuates the valve 41 to admit air pressure from the supply tank to the signal element 6 for actuation of the latter into signaling position. The interruption of the circuit to the signal element 6 will interrupt the air supply thereto and the spring thereof automatically collapses the signaling element 6 into non-signaling position. The same operation takes place to the signal element 7 when the switch or finger piece 77 thereof is in engagement with the contact 80. The signal element 6 when in signaling position indicates a right hand turn and the signaling element 7 when in signaling position indicates a stop. These signal elements when in signaling position are illuminated.

To move the signal element 8 into signaling position for the purpose of indicating a left turn the finger piece 77 of the switch is brought into engagement with the contact 81 which illuminates the electric lamp of said signal element 8 and energizes the solenoid 54 actuating the valve 42 so that the air pressure from the storage tank 46 acts to move the signal element into an extended position, as shown in dotted lines in Figure 1. To indicate a U-turn, the finger piece of the switch is brought into engagement with the contact 78, completing the electric circuit to the solenoid 31, motor 39, electric lamp of the signal element 8 and the energization of the solenoid 54. The signal element 8 moves into an extended or signalling position, also the solenoid 31 acts to swing the signal element into an angular position, as suggested in Figure 5, and the motor acts to rotate the signal element while in this angular position.

From the foregoing description it will be seen that a very efficient and effective signal has been provided wherein various signals may be given thereby with comparative ease on the part of the driver of the vehicle.

To provide a rotatable electrical connection for the electric lamp of the signal element 8 between the switch 74 and the solenoid 54, a double contact ring 90 is secured to the rotatably mounted cup-element 5 and is electrically connected to the electric lamp by conductors and is engaged by brushes 91 one of which is connected to the conductor 88 and the other connected with the conductor 82.

Having described the invention, I claim:

1. A vehicle signal comprising a mounting, a seat carried by said mounting, a base removably secured to said seat, a signal element carried by said base and including a plurality of telescopic sections of semi-transparent material with the innermost section closed at one end to form a cylinder, interconnecting connections between the sections for limiting the movement of said sections relative to each other, a spring between the innermost section and the base to collapse the sections, means under manual control for extending the sections, an electric lamp mounted in the innermost section, and electrical means for illuminating the lamp and operating in conjunction with said first means for the illumination of the electric lamp when said signal element is in extended position.

2. A vehicle signal comprising a mounting, a cup-shaped element rotatably secured to said mounting, a base hingedly secured to said cup-shaped element, a telescopic signal element carried by said base and extensible therefrom into signaling position, spring means for collapsing the signal element, said signal element constructed of semi-transparent material, an electric lamp mounted in the signal element, pneumatic means for extending the signal element into signaling position, and an electromechanical means for changing the angular position of the base with respect to the cup-shaped element and to impart rotation to the signal element when in one of its positions.

3. A vehicle signal comprising a mounting, a cup-shaped element journaled to said mounting, a base hinged to said mounting, and adapted to occupy a position in alignment with the cup-shaped element and angularly thereto, a telescopic signal element carried by said base, spring means for collapsing said signal element to occupy a non-signaling position, pneumatic means for extending the signal element into an extended position either paralleling the cup-shaped element or when disposed angularly thereto, an electric lamp in the signal element, and an electromechanical means operating in conjunction with the pneumatic means for rotating the signal element and the positioning thereof at an angle to the cup-shaped element and simultaneously illuminating the electric lamp.

4. A vehicle signal comprising a mounting, signals carried by said mounting and capable of being moved to occupy signaling and non-signaling positions, spring means for moving the signal elements into non-signaling position, illuminating means for the signal elements, and pneumatic means for moving the signal elements into signaling position, electrical control valves between said pneumatic means and the signal elements, and a manually controlled circuit for the actuation of the electrical valves and the illumination of the electrical means of the signal elements.

5. A vehicle signal comprising a mounting, signal elements carried by said mounting and capable of being moved to occupy signaling and non-signaling positions, spring means for moving the signal elements into non-signaling position, illuminating means for the signal elements, pneumatic means for moving the signal elements into signaling position, electrical control valves between said pneumatic means and the signal elements, a manually controlled circuit for the actuating of the electrical valves and the illumination of the electrical means of the signaling elements, and means by which one of the signaling elements may have its signaling position varied, and means in said circuit for varying the signaling position of said last-named signal element and for simultaneously rotating said signal element when in the last stated position.

6. A direction signal comprising a support, a mounting journaled to said support, a base hinged to said mounting, a telescopic signal element secured to the base, means to collapse said signal element to occupy a non-signaling position, means to extend said signal element to give a signal, means to swing the base relative to the mounting to change the angle of the signal element with respect to the support, and means for rotating the mounting and thereby impart turning movement to said signal element to give a second signal.

HIDEO TONAI.